(12) United States Patent
Holste et al.

(10) Patent No.: US 8,941,023 B2
(45) Date of Patent: Jan. 27, 2015

(54) METHOD FOR PRODUCING WELDED HELICAL-SEAM TUBES HAVING OPTIMIZED TUBE GEOMETRY

(75) Inventors: Carsten Holste, Goslar (DE); Franz Martin Knoop, Vlenenburg (DE)

(73) Assignee: Salzgitter Mannesmann Grossrohr GmbH, Salzgitter (DE)

( * ) Notice: Subject to any disclaimer, the term of this patent is extended or adjusted under 35 U.S.C. 154(b) by 238 days.

(21) Appl. No.: 13/504,628

(22) PCT Filed: Aug. 26, 2010

(86) PCT No.: PCT/DE2010/001029
§ 371 (c)(1),
(2), (4) Date: Jun. 19, 2012

(87) PCT Pub. No.: WO2011/050764
PCT Pub. Date: May 5, 2011

(65) Prior Publication Data
US 2012/0261387 A1    Oct. 18, 2012

(30) Foreign Application Priority Data
Oct. 28, 2009    (DE) .......................... 10 2009 051 695

(51) Int. Cl.
B23K 31/02    (2006.01)
B21C 37/12    (2006.01)
B23K 9/032    (2006.01)
B23K 9/32    (2006.01)

(52) U.S. Cl.
CPC ............. *B21C 37/128* (2013.01); *B21C 37/122* (2013.01); *B23K 9/0325* (2013.01); *B23K 9/32* (2013.01); *B23K 31/027* (2013.01); *B23K 2201/06* (2013.01); *B23K 2203/04* (2013.01)

USPC ............... 219/61; 219/62; 228/17.7; 228/145

(58) Field of Classification Search
USPC ................ 228/17.7, 145; 219/60 R, 60.2, 61; 72/49, 50
See application file for complete search history.

(56) References Cited

U.S. PATENT DOCUMENTS 3,731,041 A  *  5/1973  Gebauer .......................... 219/62
3,739,134 A  *  6/1973  Wade et al. ...................... 219/62

(Continued)

FOREIGN PATENT DOCUMENTS

DE    10 2004 058 092 A1    5/2006
GB    1 340 245 A    12/1973

(Continued)

*Primary Examiner* — Geoffrey S Evans
(74) *Attorney, Agent, or Firm* — Henry M. Feiereisen LLC

(57) ABSTRACT

In a method for producing welded helical seam tubes having optimized tube geometry a metal strip is helically formed into an open seam tube by means of a forming unit and the converging strip edges are welded together, wherein an actual diameter determined on the welded tube is compared with a specific target diameter and a possible deviation lying outside a tolerance threshold is used to correct the actual tube diameter, wherein the strip edges are completely welded in a two stage step, including tack welding as a first step immediately after the shaping to form an open seam tube and thereafter final welding as a second step. The tube diameter is measured after the complete shaping to form an open seam tube and before the final welding. For this purpose, the diameter measuring device is arranged in such a way that either the completely shaped open seam tube or the only tack-welded tube is measured.

19 Claims, 5 Drawing Sheets

(56) References Cited

U.S. PATENT DOCUMENTS

| | | | | |
|---|---|---|---|---|
| 3,845,645 A | * | 11/1974 | Gebauer | 219/62 |
| 4,061,264 A | * | 12/1977 | Bartels et al. | 228/145 |
| 4,287,739 A | * | 9/1981 | Campbell | 72/50 |
| 6,289,600 B1 | * | 9/2001 | Watts | 33/542 |
| 6,339,945 B2 | * | 1/2002 | Miller et al. | 72/49 |
| 2007/0245789 A1 | | 10/2007 | Zepp et al. | |
| 2009/0320542 A1 | * | 12/2009 | Kephart | 72/49 |

FOREIGN PATENT DOCUMENTS

| | | | |
|---|---|---|---|
| GB | 2 027 373 A | | 2/1980 |
| JP | 56105816 | | 8/1981 |
| JP | 56-111589 A | * | 9/1981 |
| JP | 60-46811 A | * | 3/1985 |
| JP | 61-180613 A | * | 8/1986 |
| JP | 61180613 | | 8/1986 |
| JP | 2000-283729 A | * | 10/2000 |

* cited by examiner

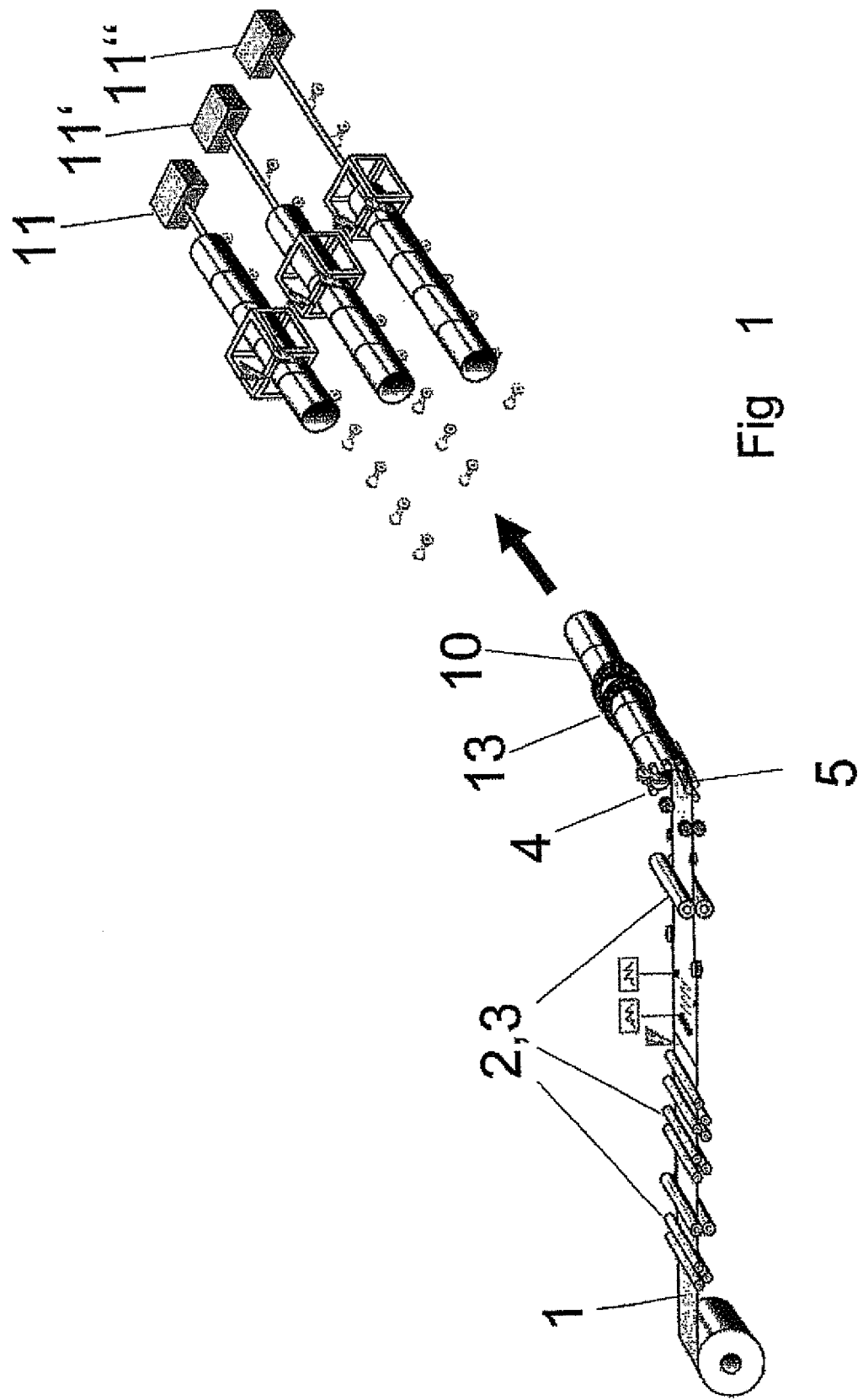

METHOD FOR PRODUCING WELDED HELICAL-SEAM TUBES HAVING OPTIMIZED TUBE GEOMETRY

CROSS-REFERENCES TO RELATED APPLICATIONS

This application is the U.S. National Stage of International Application No. PCT/DE2010/001029, filed Aug. 26, 2010, which designated the United States and has been published as International Publication No. WO 2011/050764 A1 and which claims the priority of German Patent Application, Serial No. 10 2009 051 685.6, filed Oct. 28, 2009, pursuant to 35 U.S.C. 119(a)-(d).

BACKGROUND OF THE INVENTION

In a method for producing welded helical seam tubes with optimized tube geometry a metal strip is formed to an open seam tube by means of a forming unit and the converging band edges are welded together and wherein an actual diameter which is measured on the welded tube is compared to a predetermined target diameter and a possible deviation which lies outside a tolerance threshold is used for correction of the actual diameter, wherein the complete welding of the band edges takes place in two steps with a tack welding as first step immediately after the forming as open seam tube and a subsequent final welding as second step, wherein the measurement of the tube diameter takes place after the complete forming to an open seam tube and before the final welding. A device for carrying out the method includes a forming unit in which a metal strip is formed to an open seam tube and a welding unit for tacking the tube, a welding station for final welding of the tube and a device for measuring the diameter D of the tube, wherein the diameter measuring device is arranged so that either the completely formed open seam tube or the only tack welded tube is measured.

For the transport of water, oil and gas submerged arc welded helical seam tubes, also referred to as spiral tubes are normally used, which are preferably produced from steel strips or from steel sheet.

From the brochure "spirally welded large tubes—product information—(Salzgitter Mannesmann large tube 3/08) it is known to form the strip helically into an open seam tube in a forming device and to weld the strip to a tube in a two step process.

For this purpose, the hot strip is formed into a tube in a forming unit of a tube forming machine. The forming unit includes a 3-roller beam bending system with an outer roller support cage and a so called offset roll. With the height adjustable offset roll, a possible strip edge offset of the open seam tube can be compensated.

The tube diameter is influenced by the feed angle of the strip into the forming unit and by the strip width of the used starting material. The diameter of the tube can also be influenced by means of the height adjustable offset roll.

In this manufacturing process known as "HTS-method" the strip edges of the open seam tube are welded by means of inert gas tack welding at high welding speed of up to 15 m/min, wherein the strip edges are only partially joined.

The final welding with a complete welding of the band edges with an inner and outer seam occurs subsequently in a second step on separate welding stations by means of submerged arc welding.

The advantage compared to conventional single step processes, in which the submerged arc welding seams are also produced directly in the tube forming machine and welding of the tube is thus completed in one step is that a higher capacity of the tube forming machine is achieved by the high speed of the tack welding.

Further, the generated tube geometry is not compromised by the UP (submerged arc) welding process, and with this compliance with predefined tolerance values improved.

Ever increasing demands on diameter tolerances to be complied with result in a high expense to accurately determine the tube diameter and to correct the influenced parameters if necessary.

Deviations of the tube diameter from the predetermined tolerances can for example be caused by deviations of the band width and/or the strength and expansion of he used material. These changes affect the forming process and with this the geometry of the tube.

In order to be able to influence the diameter of the welded tube it is known for example from JP 56105816 A and JP 61180613 A to measure the diameter of the completely welded tube and to use the measurement for the correction of the tube diameter. In the known processes, the tube is conventionally welded in a single step process, i.e. welding of the tube into an open seam tube is directly completed after forming of the strip.

For determining the diameter of the finished welded tube it is known for example to use laser triangulation or ultrasound. However, oftentimes the circumference of the tube is still measured with a band measure and the diameter determined there from.

The determined measurements subsequently serve for changing the feed angle of the strip or the exit angle of the welded tube (JP 611806613) or to influence the diameter of the welded tube by adjusting the offset roll (JP 56105816 A).

A disadvantage of all know methods is that the diameter is only measured after completing the welding of the tube and that only then the previously mentioned corrections are possible. The tube, which may be very long at the time of the correction, subsequently has to be reworked with high effort or even be scrapped.

SUMMARY OF THE INVENTION

Object of the invention is to improve the method for producing welded helical seam tubes from steel such that deviations from the demanded tube diameter can be recognized as early as possible and corrective measures be taken if necessary.

This object is solved by a method for producing welded helical seam tubes with optimized tube geometry, comprising the steps of helically forming a metal strip into an open seam tube by using a forming unit; tack-welding converging metal strip edges to one another to produce a tack welded tube; measuring an actual tube diameter of the tack welded tube: comparing the actual tube diameter to a predetermined target tube diameter; determining a deviation of the actual tube diameter from the target tube diameter; when the deviation lies outside a tolerance threshold, correcting the actual tube diameter as a function of the deviation; and completing welding of the strip edges. Advantageous refinements are set forth in the sub claims.

According to the teaching of the invention, a method for the production of welded helical seam tubes with optimized tube geometry is used, wherein a metal strip is helically formed into an open seam tube by means of a forming unit and the converging strip edges are welded together. Here, a determined actual diameter measured on the welded tube is compared to a predetermined target diameter and a possible deviation which lies outside of a tolerance threshold is used for correction of the actual diameter. The complete welding of the strip edges takes place in a two stage two step with a tack welding as first step immediately after the forming into the open seam tube and a subsequent final welding as second step, wherein the measurement of the tube diameter is carried out after the complete forming into an open seam tube and before the final welding.

The advantage of the proposed approach is that, compared to known processes, in which only the finally welded tube is measured, in the method according to the invention corrective measures can be taken during the manufacturing process already in a very early manufacturing stage and in this way possible waste can be reduced to a minimum.

The measurement of the tube diameter advantageously takes place directly after the forming into an open seam tube in a limited region surrounding the tack welding, so that possible necessary changes in the tube diameter can be recognized immediately after the forming and corrections be made.

Advantageously, the diameter is determined in a continuous process during manufacturing to allow continuous readjustment or control, respectively. The diameter can advantageously be measured contact free for example by means of laser triangulation or ultrasound, however, other measurement methods are also conceivable. In case of deviations from the tolerance specifications, the diameter of the welded tube can be influenced or corrected by changing the feed angle of the strip, the height adjustment of the offset roll or the exit angle of the welded tube.

BRIEF DESCRIPTION OF THE DRAWING

Further features, advantages and details of the invention result from the following description.

It is shown in:

FIG. 1 a schematic representation of the two step manufacturing method of welded helical seam tubes, FIG. 2a as FIG. 1, however, as detailed representation with the device for diameter measurement according to the invention, FIG. 2b detail from FIG. 2a with a schematic representation of the tube forming in a cross section, FIG. 3 schematic representation of the geometric dependence of the tube diameter on the feed angle and the width of the band, FIG. 4 schematic representation of across section of a tack welding

DETAILED DESCRIPTION OF PREFERRED EMBODIMENTS

Figure 2A:
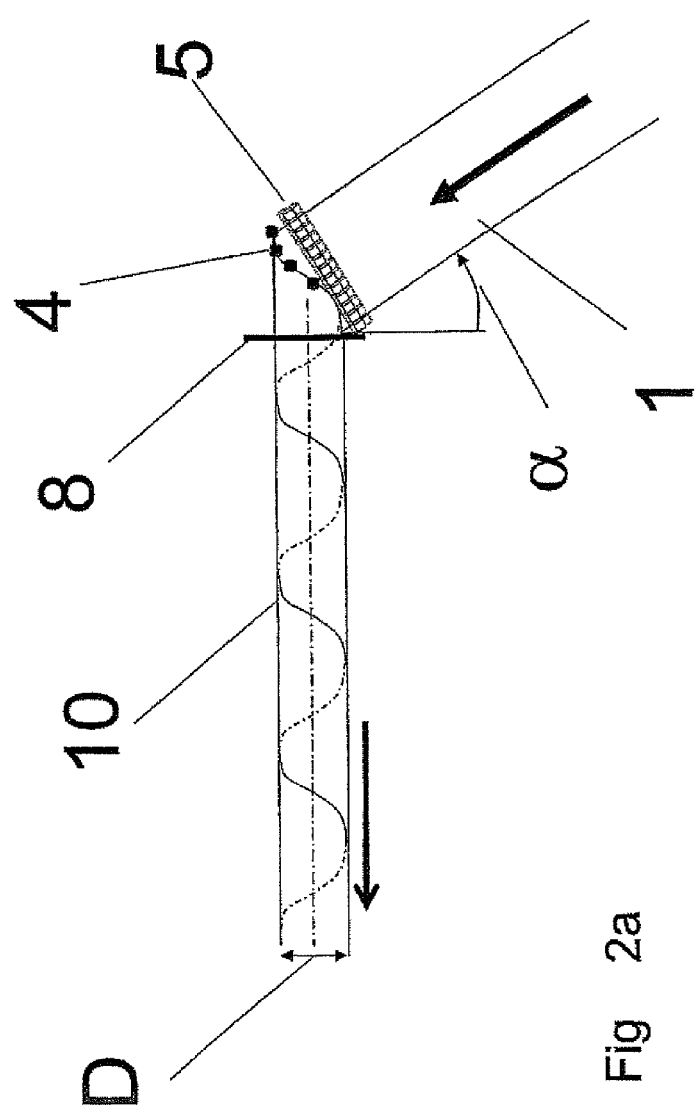

FIG. 1 shows a schematic representation of the two step manufacturing process of welded helical seam tubes.

Shown is a metal strip 1 which is rolled off from a coil, which metal band 1 reaches the forming unit 4 via drive rollers and straightening rollers 2 or 3 respectively. After the forming into an open seam tube and subsequent tacking in a welding unit 7 (see FIG. 2b) the thus produced tube 10 is then cut to length in a separation device 13 and after this reaches separate welding stations 11, 11', 11" in which welding of the tubes is completed.

FIG. 2a shows the device for diameter measurement according to the invention of FIG. 1 in a detailed representation, wherein same reference signs are used for same parts. The metal strip 1 enters the forming unit 4 at an angle α and is there formed into a tube 10 having a diameter D. Immediately after the forming of the metal strip 1 into an open seam tube a diameter measuring device (8) is arranged which either measures the open seam tube or the tube directly behind the tack site.

Figure 2B:
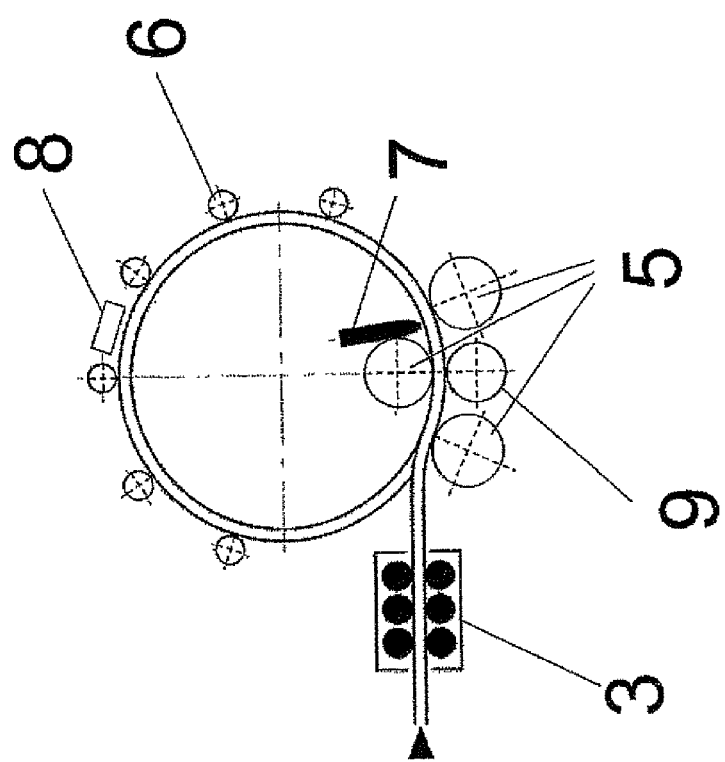
Figure 4:
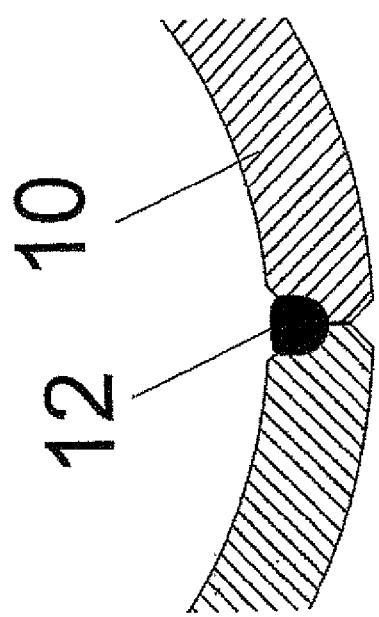

FIG. 2b shows the forming unit 4 from FIG. 2a with the diameter measuring device 8 in a schematic representation in more detail. The forming unit 4 includes a 3-roller beam bending system 5 with outer support cage 6, the welding unit 7 for the tack welding and the diameter measuring device 8. A schematic representation of a tack welding 12 on the tube 10 is shown in FIG. 4.

The diameter measuring device 8 is arranged according to the invention in the region of the completely formed open seam tube 10. A height adjustable offset roll 9 arranged in the region of the 3-roller beam bending system 5 allows adjusting an offset of the strip edges of the open seam tube immediately before the tacking. Also, the tube diameter can be changed by means of the offset roll 9 within certain limits.

Figure 3:
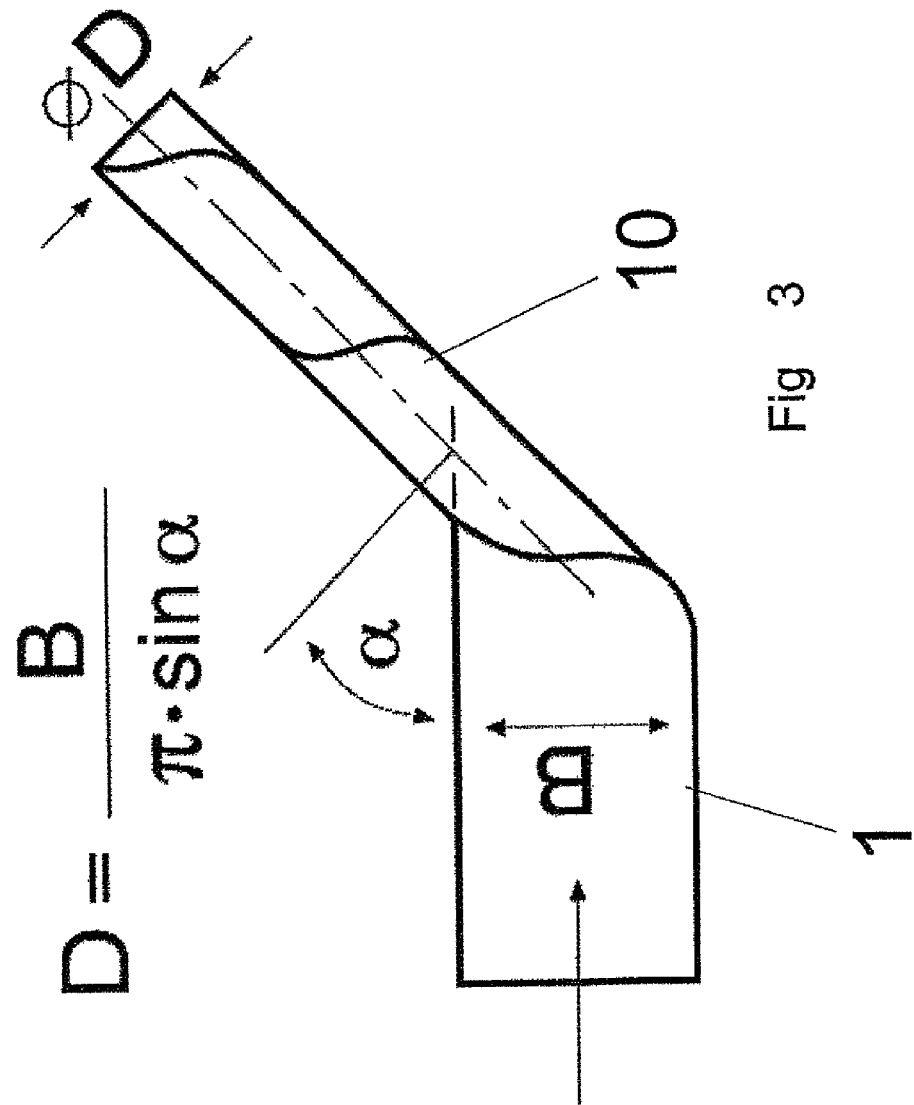

FIG. 3 shows a schematic representation of the geometric dependence of the tube diameter on the feed angle α and the width of the entering metal strip 1.

Here, the angle α between the entering metal strip 1 and the formed tube 10 determines at constant band width directly the diameter D of the tube 10. By changing the angle α, a correction can be made during the manufacture in case of deviations from the target diameter. This correction can take place by adjusting the feed angle of the strip or by changing the exit angle of the welded tube. With the arrangement according to the invention of the diameter measuring device 8 in the region of the tack welding of the forming unit 4 the diameter of the tube 10 is measured at the earliest possible time point, wherein in case of deviations from the set value, the diameter D of the tube 10 can be readjusted via a control or regulation unit which is not shown here.

The invention claimed is:

1. A method for producing welded helical seam tubes with optimized tube geometry, comprising the steps of:
   helically forming a metal strip into an open seam tube by using a forming unit;
   tack-welding converging metal strip edges to one another to produce a tack welded tube;
   measuring an actual tube diameter of the tack welded tube;
   comparing the actual tube diameter to a predetermined target tube diameter;
   determining a deviation of the actual tube diameter from the target tube diameter;
   when the deviation lies outside a tolerance threshold, correcting the actual tube diameter as a function of the deviation; and
   completing welding of the strip edges.

2. The method of claim 1, wherein the measured actual diameter is used as regulating variable for controlling or regulating the actual tube diameter.

3. The method of claim 1, wherein the measuring is carried out in a continuous manner.

4. The method of claim 1, further comprising measuring an actual tube diameter of the open seam tube prior to or during the tack welding.

5. The method of claim 4, wherein the measuring is carried out in a continuous manner.

6. The method of claim 4, wherein the measuring takes place by means of a laser-triangulation procedure.

7. The method of claim 4, wherein the measuring takes place by means of ultrasound.

8. The method of claim 1, wherein the measuring is contact free.

9. The method of claim 8, wherein the measuring takes place by means of a laser-triangulation procedure.

10. The method of claim 8, wherein the measuring takes place by means of ultrasound.

11. The method of claim 10, wherein the actual tube diameter is controlled or regulated by changing at least one member selected from the group consisting of a feed angle of the metal strip, an exit angle of the tack welded tube and a height adjustment of an offset roll.

12. A device for producing welded helical seam tubes with optimized tube geometry, comprising:
- a forming unit for forming a metal strip into an open seam tube;
- a welding unit for tack welding the open seam tube;
- a welding station for final welding of the tack welded tube; and
- a diameter measuring device for measuring a diameter of the tube, wherein the diameter measuring device is arranged so that either the completely formed open seam tube or the only tack welded tube is measured.

13. The device of claim 12, wherein the
diameter measuring device is constructed for contactless measurement of the diameter of the tube.

14. The device of claim 12, wherein the
diameter measuring device is constructed for continuous measurement of the tube diameter.

15. The device of claim 12, further comprising a control or regulating unit, wherein the diameter measuring device is connected to the control or regulating unit for readjusting the diameter of the tube.

16. The device of claim 12, wherein the diameter measuring device is a laser.

17. The device of claim 16, further comprising a control or regulating unit, wherein the diameter measuring device is connected to the control or regulating unit for readjusting the diameter of the tube.

18. The device of claim 12, wherein the diameter measuring device is an ultrasound device.

19. The device of claim 18, further comprising a control or regulating unit, wherein the diameter measuring device is connected to the control or regulating unit for readjusting the diameter of the tube.

* * * * *